United States Patent
Wahba et al.

(10) Patent No.: US 11,724,709 B2
(45) Date of Patent: Aug. 15, 2023

(54) TECHNIQUES TO CONTROL A DRIVING BEHAVIOR OF A VEHICLE WHEN A FAILURE OCCURS

(71) Applicant: TUSIMPLE, INC., San Diego, CA (US)

(72) Inventors: Mohamed Hassan Ahmed Hassan Wahba, Tucson, AZ (US); Yu-Ju Hsu, Tucson, AZ (US); Zehua Huang, San Diego, CA (US); Xiaoling Han, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 117 days.

(21) Appl. No.: 17/383,190

(22) Filed: Jul. 22, 2021

(65) Prior Publication Data
US 2023/0027572 A1 Jan. 26, 2023

(51) Int. Cl.
*B60W 50/029* (2012.01)
*B60W 50/02* (2012.01)
*B60W 10/20* (2006.01)
*B60W 10/18* (2012.01)
*B60W 60/00* (2020.01)

(52) U.S. Cl.
CPC .......... *B60W 50/029* (2013.01); *B60W 10/18* (2013.01); *B60W 10/20* (2013.01); *B60W 50/0205* (2013.01); *B60W 60/0015* (2020.02); *B60W 2556/60* (2020.02)

(58) Field of Classification Search
CPC .... B60W 50/029; B60W 10/18; B60W 10/20; B60W 50/0205; B60W 60/0015; B60W 2556/60; B60W 60/007
See application file for complete search history.

(56) References Cited

U.S. PATENT DOCUMENTS

2020/0201324 A1   6/2020   Darayan et al.

*Primary Examiner* — Alan D Hutchinson
(74) *Attorney, Agent, or Firm* — Paul Liu; Glenn Theodore Mathews; Perkins Coie, LLP

(57) ABSTRACT

Techniques are described to enable a vehicle, such as an autonomous vehicle, to steer and/or apply brakes on a road when a failure condition occurs. An example method for autonomous driving operation includes receiving a reduced set of location information that describes a location of the autonomous vehicle on a road; receiving a reduced set of trajectory information where the autonomous vehicle is expected to be driven; determining a driving path information where the autonomous vehicle is expected to be driven; and in response to determining an occurrence of a fault condition: sending a first instruction to cause the autonomous vehicle to steer the autonomous vehicle using at least the driving path information and the reduced set of location information, and sending a second instruction to cause the autonomous vehicle to apply brakes.

20 Claims, 6 Drawing Sheets

TECHNIQUES TO CONTROL A DRIVING BEHAVIOR OF A VEHICLE WHEN A FAILURE OCCURS

TECHNICAL FIELD

This document relates to systems, apparatus, and methods to enable a vehicle (e.g., an autonomous vehicle) to control a driving behavior (e.g., steer and/or apply brakes) when a system and/or a device failure occurs in the vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may control the steering angle, a throttle amount to control the speed of the autonomous vehicle, gear changes, and/or a breaking amount to control the extent to which the brakes are engaged. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

Techniques are described to enable a vehicle, such as an autonomous vehicle, to steer and/or apply brakes on a road when a failure condition occurs.

An example system for autonomous driving operation comprises an autonomous vehicle that includes a first computer and a second computer. The first computer includes a first processor configured to: obtain, from a set of location information that describes a location of the autonomous vehicle on a road, a reduced set of location information for the location of the autonomous vehicle; obtain, from a set of trajectory information that includes a set of location data associated with a plurality of points on the road where the autonomous vehicle is expected to be driven, a reduced set of trajectory information that includes a reduced set of location data associated with the plurality of points; and send the reduced set of location information and the reduced set of trajectory information to the second computer located in the autonomous vehicle. The second computer comprises a second processor configured to: receive the reduced set of location information and the reduced set of trajectory information; determine a driving path information where the autonomous vehicle is expected to be driven on the road based on the reduced set of trajectory information; and in response to a determination of an occurrence of a fault condition that indicates a failure of one or more devices on the autonomous vehicle: send a first instruction to cause the autonomous vehicle to steer the autonomous vehicle according to the driving path information and the reduced set of location information of the location of the autonomous vehicle, and send a second instruction to cause the autonomous vehicle to apply brakes.

In some embodiments, for each point in the set of trajectory information and the reduced set of trajectory information, a size of location data associated with one point in the set of trajectory information is greater than that of a corresponding point in the reduced set of trajectory information. In some embodiments, the reduced set of location information include a longitude value, a latitude reference value, and an altitude value obtained from the set of location information, and each of the longitude value, the latitude reference value, and the altitude value is associated with a pre-determined numerical characteristic. In some embodiments, the pre-determined numerical characteristic includes a whole number or a number with n-decimal places, where n is greater than or equal to 1. In some embodiments, the set of location information describes the location of the autonomous vehicle using cartesian coordinates, and the reduced set of location information is obtained by a conversion performed on the set of location information from the cartesian coordinates to spherical coordinates.

In some embodiments, the reduced set of location information is sent to the second computer in a first set of data frames at a first pre-determined frequency, and the reduced set of trajectory information is sent to the second computer in a second set of data frames at a second pre-determined frequency. In some embodiments, the second pre-determined frequency is greater than the first pre-determined frequency. In some embodiments, each data frame in the second set of data frames includes one or more locations from the reduced set of location data and one or more index values corresponding to the one or more locations. In some embodiments, a total number of the plurality of points is pre-determined, and the total number of the plurality of points is sent to the second computer. In some embodiments, the reduced set of location information and the reduced set of trajectory information includes geographic information with a precision that is less than that of the set of location information and the set of trajectory information, respectively.

An example computer located in an autonomous vehicle comprises a processor, configured to implement a method comprising: receive, from another computer located in the autonomous vehicle, a reduced set of location information that describes a location of the autonomous vehicle on a road, where the reduced set of location information includes information that is less than that associated with a set of location information for the location of the autonomous vehicle; receive, from the another computer, a reduced set of trajectory information that includes a reduced set of location data associated with a plurality of points on the road where the autonomous vehicle is expected to be driven, where the reduced set of trajectory information includes information that is less than that associated with a set of trajectory information that includes a set of location data associated with the plurality of points; determine a driving path information where the autonomous vehicle is expected to be driven on the road based on the reduced set of trajectory information; and in response to a determination of an occurrence of a fault condition that indicates a failure of one or more devices on the autonomous vehicle: send a first instruction to cause the autonomous vehicle to steer the autonomous vehicle according to the driving path information and the reduced set of location information of the location of the autonomous vehicle, and send a second instruction to cause the autonomous vehicle to apply brakes.

In some embodiments, the reduced set of location data in the reduced set of trajectory information is determined based on the location of the autonomous vehicle and the set of location data associated with the plurality of points in the set of trajectory information. In some embodiments, the reduced set of location data in the reduced set of trajectory information describe, for each point, a position information of a point relative to the location of the autonomous vehicle. In some embodiments, the driving path information includes a set of position information along a fitted line that fits the plurality of points associated with the reduced set of trajectory, the fitted line is determined by an application of an n-th order polynomial to the reduced set of trajectory information, and a value for n is pre-determined. In some embodiments, the processor of the computer is configured to determine that the fault condition occurs in response to a reception of a message that indicates that images or sensor data are not received from a plurality of cameras on the autonomous vehicle.

An example non-transitory computer readable program storage medium includes code stored thereon, the code, when executed by a processor, causing the processor to implement a method comprising: receiving, from another computer located in the autonomous vehicle, a reduced set of location information that describes a location of the autonomous vehicle on a road, where the reduced set of location information includes information that is less than that associated with a set of location information for the location of the autonomous vehicle; receiving, from the another computer, a reduced set of trajectory information that includes a reduced set of location data associated with a plurality of points on the road where the autonomous vehicle is expected to be driven, where the reduced set of trajectory information includes information that is less than that associated with a set of trajectory information that includes a set of location data associated with the plurality of points; determining a driving path information where the autonomous vehicle is expected to be driven on the road based on the reduced set of trajectory information; and in response to determining an occurrence of a fault condition that indicates a failure of one or more devices on the autonomous vehicle: sending a first instruction to cause the autonomous vehicle to steer the autonomous vehicle according to the driving path information and the reduced set of location information of the location of the autonomous vehicle, and sending a second instruction to cause the autonomous vehicle to apply brakes.

In some embodiments, a steering angle with which the autonomous vehicle is steered is included in the first instruction to cause the autonomous vehicle to steer, and the steering angle is determined based on the driving path information, the reduced set of location information of the location of the autonomous vehicle, a heading of the autonomous vehicle, and a speed of the autonomous vehicle. In some embodiments, the steering angle is determined using a course correction trajectory information that includes a set of points that indicate a trajectory that minimizes a difference between the driving path information and a current trajectory of the autonomous vehicle, the current trajectory of the autonomous vehicle is defined by reduced set of location information of the autonomous vehicle and the heading of the autonomous vehicle, and the course correction trajectory information depends on whether the speed of the autonomous vehicle is greater than or equal to a pre-determined threshold.

In some embodiments, a maximum distance between any two points in the plurality of points is pre-determined. In some embodiments, the fault condition is determined to occur in response to determining that the computer has not received the following information for more than a pre-determined length of time: another reduced set of location information for another location of the autonomous vehicle on the road, or another reduced set of trajectory information that include another set of points on the road where the autonomous vehicle is expected to be driven.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

An autonomous vehicle may include several subsystems that can enable the autonomous vehicle to be driven on a road. For example, a vehicle sensor subsystem can enable the autonomous vehicle to obtain sensor data about the environment in which the autonomous vehicle is being driven. The sensors on the autonomous vehicle may include cameras, LiDAR, RADAR, inertial measurement unit (IMU), etc. Other subsystems on the autonomous vehicle include brakes, transmission, steering system, etc., that enable the autonomous vehicle to be driven autonomously. In some cases, a part of a subsystem (e.g., transmission) or the entire subsystem (e.g., all cameras) may experience a fault or failure condition such that the autonomous vehicle may not be able to safely operate on the road. At least in such failure conditions, which could be considered severe or critical failure conditions, the autonomous vehicle should steer and/or apply brakes so that the autonomous vehicle can safely stop the autonomous vehicle. This patent document describes systems, apparatus, and methods to enable a vehicle (e.g., an autonomous vehicle) to steer and/or apply brakes when a failure condition occurs.

Figure 1A:
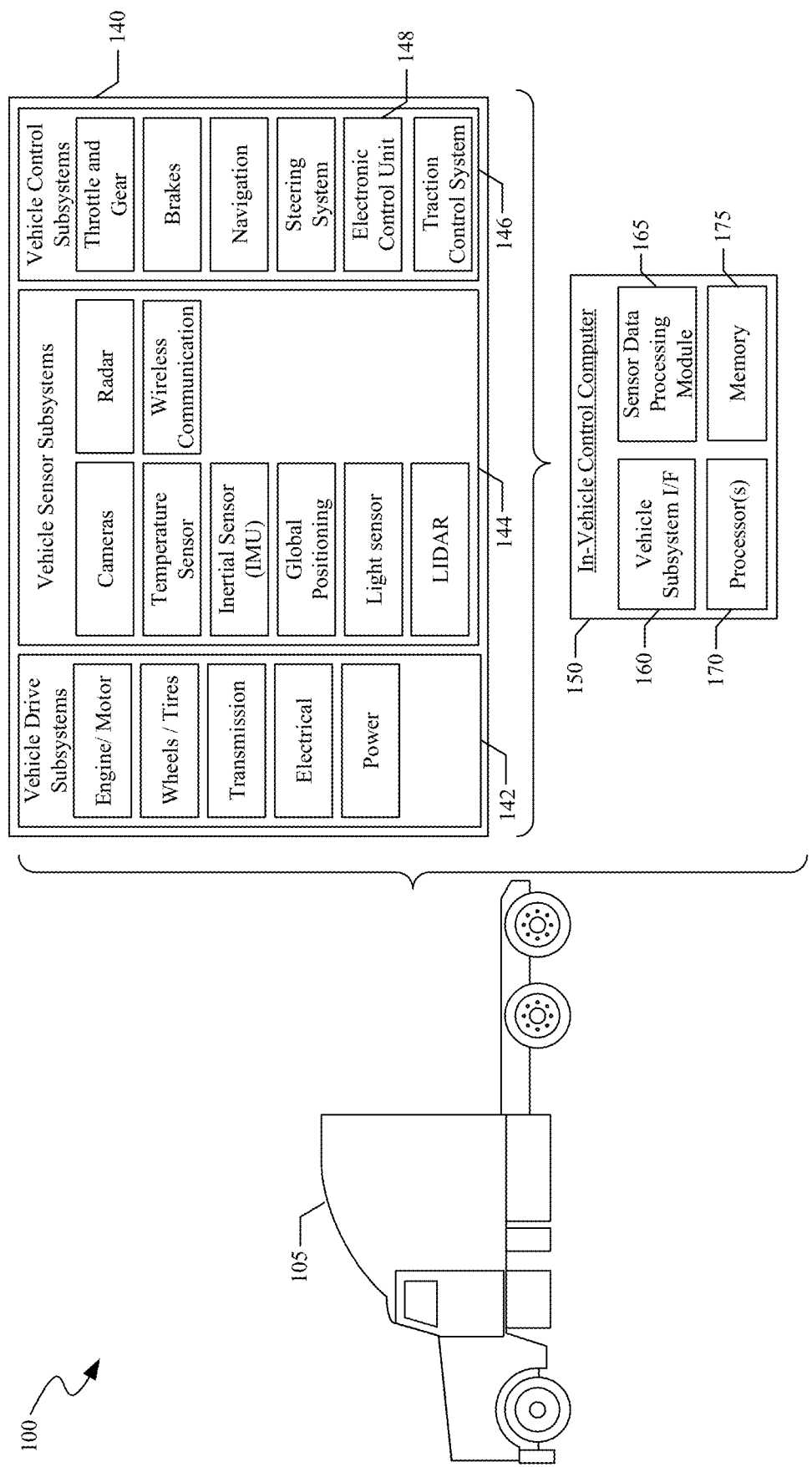
FIG. 1A shows a block diagram of an example vehicle ecosystem.

FIG. 1A shows a block diagram of an example vehicle ecosystem 100 in which an in-vehicle control computer 150 located in the autonomous vehicle 105 can send to an electronic control unit (ECU) the autonomous vehicle's 105 location and trajectory where the autonomous vehicle 105 is expected to be driven. At least this information can enable the ECU to send instructions to the autonomous vehicle 105 to steer and/or apply brakes when a failure occurs. As shown in FIG. 1A, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The autonomous vehicle 105 may include various vehicle subsystems that support the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems. Alternatively, in some embodiments, one or more components or devices can be removed from the various subsystems. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, and/or a wireless communication unit (e.g., a cellular communication transceiver). The vehicle sensor subsystem 144 may also include sensors configured to monitor internal systems of the autonomous vehicle 105 (e.g., an O$_2$ monitor, a fuel gauge, an engine oil temperature, etc.,). In some embodiments, the vehicle sensor subsystem 144 may include sensors in addition to the sensors shown in FIG. 1A.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an electronic control unit (ECU) 148. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The electronic control unit (ECU) 148 may be configured to control the autonomous vehicle 105 for operation without a driver or to provide driver assistance in controlling the autonomous vehicle 105. In some embodiments, the ECU 148 may be configured to incorporate data from the GPS device, the RADAR, the LiDAR, the cameras, and/or other vehicle subsystems to determine the driving path or trajectory or driving related operation (e.g., steering or braking) for the autonomous vehicle 105. In some embodiments, the ECU 148 may represent a control system configured to identify, evaluate, avoid and/or otherwise negotiate potential obstacles in the environment of the autonomous vehicle 105.

Figure 1B:
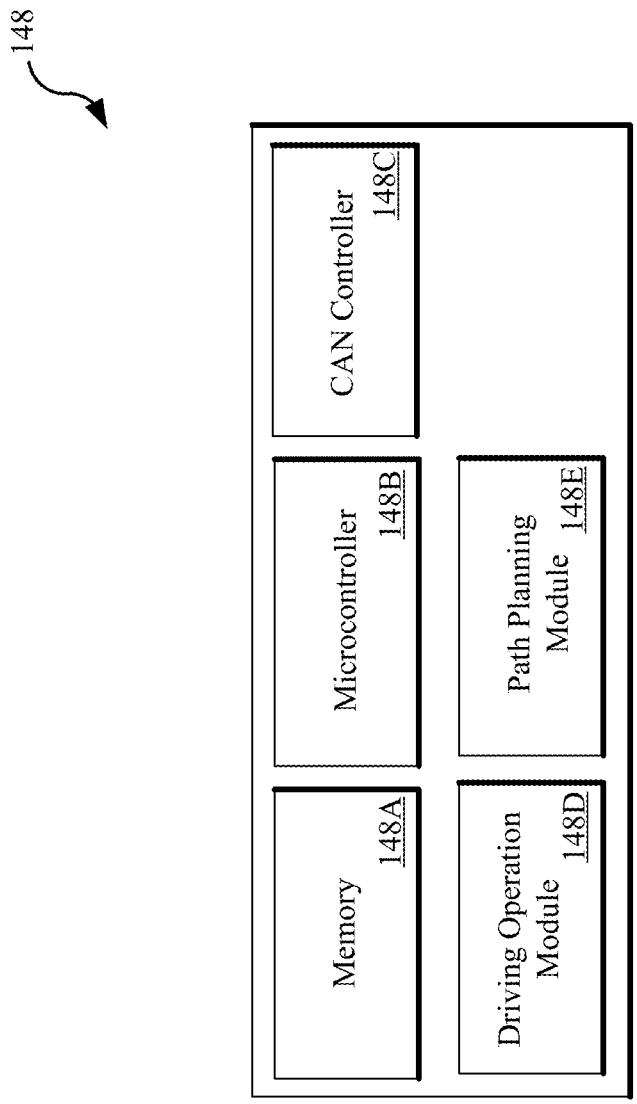
FIG. 1B shows a block diagram of an electronic control unit (ECU) in a vehicle.

FIG. 1B shows a block diagram of the ECU 148. The ECU 148 may include a memory 148A that may contain processing instructions executable by the microcontroller or processor 148B to perform various methods and/or functions of the ECU, including those described for the driving operation module 148D and the path planning module 148E as explained in this patent document. The ECU 148 may include a CAN controller 148C with which the ECU 148 can communicate with the various devices/subsystems in the vehicle 105. The ECU may also be referred to as a vehicle control unit (VCU) that may be purchased from commercial automotive parts suppliers. The ECU may be referred to as a computer and may perform operations described in FIG. 4 (e.g., operations 408-412) and in FIG. 5.

In FIG. 1A, the vehicle control subsystem 140 may also include a traction control system (TCS). The TCS may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the sensor data processing module 165 as explained in this patent document. For example, the processor 170 of the in-vehicle control computer 150 and may perform operations described in FIG. 4 (e.g., operations 402-406).

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

Figure 2:
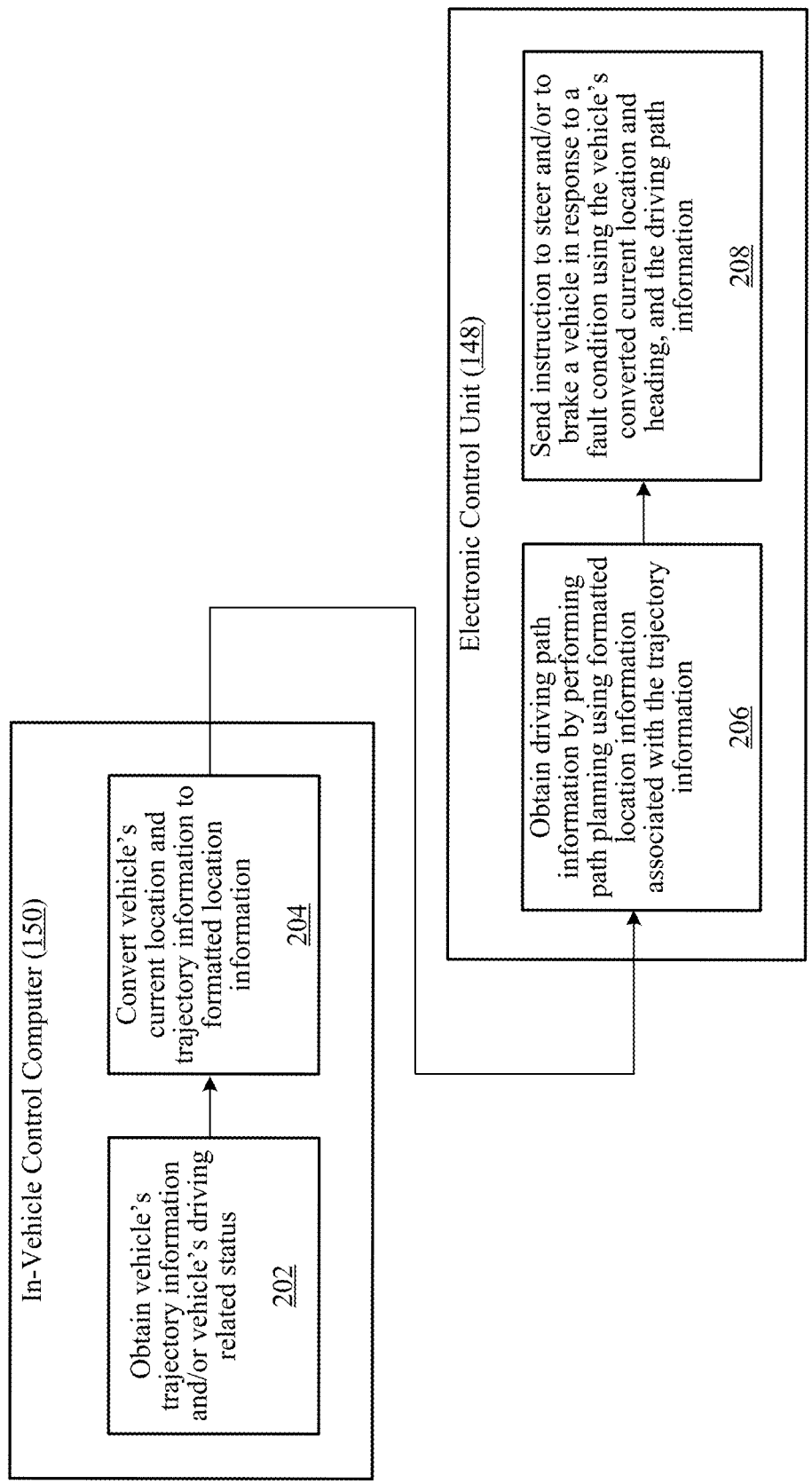
FIG. 2 shows a flowchart of operations performed to control a vehicle by generating a brake command and/or steering command when a failure condition occurs.

FIG. 2 shows a flowchart of operations performed by an in-vehicle control computer and an ECU in a vehicle to control a vehicle by generating a brake command and/or steering command when a failure condition occurs. At operation 202, the sensor data processing module (shown as 165 in FIG. 1A) in the in-vehicle control computer 150 may obtain the vehicle's driving related status and/or the vehicle's trajectory information. The vehicle's driving related status may include information such as the vehicle's current speed, the vehicle's current location that may be obtained from the GPS device in the vehicle, and/or the vehicle's current heading or direction. In this patent document, the term "current location" or "current trajectory" of the vehicle can be a location or a trajectory of a vehicle at one point in time.

The sensor data processing module can determine and obtain the vehicle's trajectory information that may include a plurality of points that describe a trajectory on which the vehicle is expected to drive from a current location of the vehicle. For example, a first point to an n-th point of the plurality of point can identify GPS locations of points on the road where the vehicle is expected to drive. The plurality of points may follow a centerline of a lane on which the vehicle is driven and may start from a current location of the vehicle. Each of the plurality of points may be associated with GPS coordinates (e.g., in X, Y, Z cartesian coordinates format) and an index value. As further explained in this patent document, the index value associated with each point is a beneficial technical feature that can enable the ECU's path planning module (shown as 148E in FIG. 1B) to specifically determine whether trajectory information associated with one or more points has not been received by the ECU. A maximum distance between two points may be pre-determined (e.g., a maximum of 1-meter between two points). In some embodiment, a total number of the plurality of points may be predetermined (e.g., 200 points).

At operation 204, the sensor data processing module in the in-vehicle control computer 150 may convert the vehicle's current location and the trajectory information to formatted location information that can be sent to and processed by the ECU. In some embodiments, the sensor data processing module can send the vehicle's current heading to the ECU. In some embodiments, the ECU's memory (shown as 148A in FIG. 1B) may have limited storage and/or the microcontroller may have limited processing capabilities so that the ECU may not be able to process a wealth of information that is usually in GPS coordinates associated with the current location of the vehicle (or a location at one point in time) and the plurality of points of the trajectory information. For example, the vehicle's current location and each of the plurality of points may be associated with GPS coordinates that may have up to seven numbers before a decimal point and up to three numbers after the decimal point for cartesian coordinates (also known as earth-centered, earth-fixed (ECEF) cartesian coordinates), or the GPS coordinates may have up to twelve numbers after a decimal point for Lat-Long-Height (LLH) coordinates (also known as spherical coordinates). Such values may be provided by a sensor data processing module of the in-vehicle control computer after determining a trajectory information. However, the precision offered by GPS coordinates up to, for example, twelve numbers after a decimal point for LLH coordinates may not be needed for the vehicle control related operations performed by the driving operation module (shown as 148D in FIG. 1B) of the ECU. Thus, in some embodiments, the sensor data processing module may convert the GPS coordinates to a formatted location information that can be received and processed by the ECU. The formatted location information may include a reduced current location of the vehicle and a reduced trajectory information that have geographic information with a precision that is reduced compared to the precision of the geographic information indicated by the vehicle's current location and by the trajectory information.

In some embodiments where the GPS coordinates are LLH coordinates, the sensor data processing module can convert the LLH coordinates to cartesian coordinates for a current location of the vehicle, where the sensor data processing module can round up or down the converted cartesian coordinates to whole numbers or the sensor data processing module can determine that the converted cartesian coordinates can have values up to n-digits after the decimal point (e.g., up to two digits after the decimal point). In such embodiments, the sensor data processing module can obtain for the vehicle's current location a longitude reference, an altitude reference, and a latitude reference, where each of the longitude reference, the altitude reference, and the latitude reference can be associated with a pre-determined numerical characteristic. For example, the longitude reference can have a whole number value from −180 to 180, the attitude reference can have a value from −600 to 4315.05 (and may include n-decimal places (e.g., n is greater than or equal to 1, or n is equal to 2), and the latitude reference can have a whole number value from −90 to 90. In sensor data processing module can determine position information for each point in the plurality of points based on the GPS coordinates of each point and based on the vehicle's current location, where the position information of each of the plurality of points can be determined relative to the vehicle's current location. The position information of each point may be in a X-Y cartesian coordinates. For example, the sensor data processing module can determine the position information for each point in the plurality of points to have a value (or converted GPS coordinates) having a pre-determined numerical characteristic. For example, the value for the plurality of points may be between −204.8 and 204.8 where the value can have up to two numbers after the decimal point. Thus, at operation 204, the sensor data processing module obtains the formatted location information that comprises the converted GPS coordinates of the vehicle's current location and/or the position information of each point in the plurality of points.

The sensor data processing module sends the formatted location information to the ECU for further processing. At operation 206, the path planning module (shown as 148E in FIG. 1B) can receive and perform operations on the formatted location information. In some embodiments, the formatted location information can be sent by the sensor data processing module via a CAN communication bus or another communication protocol. In some embodiments, the sensor data processing module can send the formatted location information in data frames or data packets at a pre-determined rate, where the data frames or data packets can have a pre-determined amount of data. For example, the sensor data processing module can send converted GPS coordinates of the vehicle's current location in two data frames or two packets, where the first data frame or first data packet may include the converted longitude reference, and the second data frame or second data packet may include the converted altitude reference and the converted latitude reference, and where the two data frames or two data packets can be sent at a first pre-determined frequency (e.g., 1 Hz). In this example, the sensor data processing module can send the position information of at least two points in the plurality of points in one data frame or one packet, and the sensor data processing module can sequentially send the position information of the plurality of points at a second pre-determined frequency (e.g., 25 Hz). Thus, for example, if a total number of plurality of points is 200, the second pre-determined frequency is 25 Hz, and the first pre-determined frequency is 1 Hz, then the sensor data processing module can send two data frames comprising the converted GPS coordinates of the vehicle's current location once every second, and the sensor data processing module can send position information of 50 points every second (if one data frame or one data packet comprises position information of two points). In this example, the ECU may obtain position information of all 200 points in one second if four data frames are sent at 25 Hz.

The sensor data processing module can send a value (e.g., 200) indicating a total number of the plurality of points in a data frame comprising at least some of the converted GPS coordinates of the vehicle's current location. Information about the total number of the plurality of points can enable the ECU to determine whether it has a complete set of position information for the plurality of points. The sensor data processing module transmit a data frame comprising a position information a point, where the data frame comprises an index value corresponding to that point. The path planning module of the ECU can determine whether the ECU has received position information for all points based on the index value associated with each point and based on the total number of the plurality of points. In some embodiments, if the path planning module determine that it has not received a position information associated with an index value of a point, then the path planning module can send a message to the sensor data processing module requesting a missing position information corresponding to an index, where the sensor data processing module can, upon receiving the message, send the missing position information for the index to the path planning module. In some other embodiments, if the path planning module determines that it has not received a position information associated with an index value of a point, then the path planning module can interpolate the missing position information using the position information of at least one point before the point and the position information of at least one point after the point, or the path planning module can extrapolate the missing position information using the position information of at least two points immediately before or immediately after the point whose position information is missing.

At operation 206, the path planning module can concatenate the position information of the plurality of points to obtain a concatenated set of points. The path planning module can apply an n-th order polynomial (e.g., 10-th order polynomial) to the concatenated set of points to obtain a fitted line that best fits the concatenated set of points. In some embodiments, the value for n for the n-th order polynomial may be pre-determined (e.g., n=5 or n=10). In some embodiments, using a higher-order polynomial (e.g., 5th order, 7th order, or 10-th order) is technically advantageous since it can enable the path planning module to determine a fitted line for a set of points whose positions vary considerably from each other on a road (e.g., on a road with a winding path). The path planning module can determine a set of position information (e.g., GPS coordinates) associated with points on the fitted line so that the set of position information associated with the fitted line comprise the driving path information on which the vehicle is expected to be driven.

In some embodiments, the path planning module can re-evaluate the fitted line to remove issues with heading calculations if the points are too coarse. A technical benefit of using a higher-order polynomial fitted line is that it can be continuous and differentiable so it can smooth out any coarseness that was a result of the approximations to obtain the fitted line.

In some embodiments, operations 202, 204, and 206 are continuously performed so that every certain amount of time (e.g., 4 seconds in the example mentioned above), the path planning module can have a complete set of position information for the plurality of points with which it can obtain a driving path information.

At operation 208, if the driving operation module (show as 148D in FIG. 1B) of the ECU determines that a fault condition has occurred, the driving operation module can send instructions to steer and/or to brake vehicle using at least the converted GPS coordinates of the vehicle's current location, the vehicle's heading (that can be obtained from the sensor data processing module), and the driving path information. The driving operation module can send instructions to one or more motors in the steering system to steer the vehicle to be driven along or close to a driving path indicated in the driving path information, and the driving operation module can send instructions to the actuators associated the brakes to apply brakes to the vehicle as it is being driven along or close to the driving path. In some embodiments, instructions to apply the brakes can cause the vehicle to stop on the road. The operations performed by the driving operation module at operation 208 is further described in the context of example scenario shown in FIG. 3 below.

Figure 3:
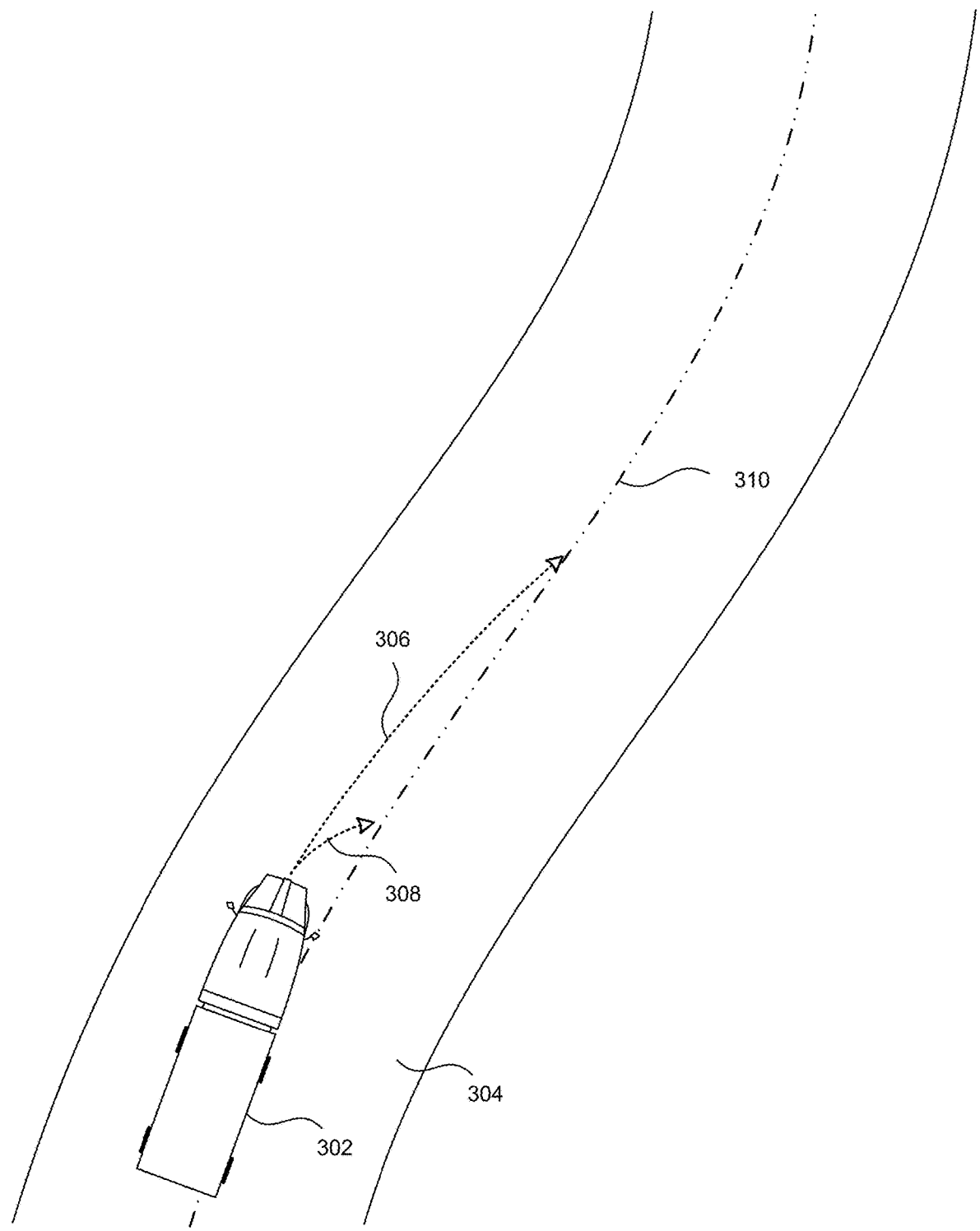
FIG. 3 shows an example scenario where a vehicle is steered to a driving path.

FIG. 3 shows an example scenario where a vehicle 302 is steered to a driving path using converted GPS coordinates of the vehicle's current location and the driving path information 310. In the scenario shown in FIG. 3, the vehicle 302 is shown as being driven to a left of the centerline of a lane 304 on a road. The driving path information 310 is determined by the path planning module and can generally follow a centerline of the lane 304. In some embodiments, the driving operation module can determine the amount of steering (e.g., a steering angle/offset) to apply based on the converted GPS coordinates of the vehicle's current location, the vehicle's heading, the driving path information, and the current speed of the vehicle 302. The driving operation module can obtain the current speed of the vehicle 302 from the sensor data processing module. If the driving operation module determines that the current speed of the vehicle 302 is greater than or equal to a pre-determined threshold, then the driving operation module can use a pure pursuit controller algorithm to determine the amount of steering to apply to direct the vehicle to merge with or come close to (e.g., within a pre-determined distance of) the driving path from the current location of the vehicle. In another example, if the driving operation module determines that the current speed of the vehicle 302 is less than a pre-determined threshold, then the driving operation module can use a Stanley controller algorithm to determine the amount of steering to apply to direct the vehicle to merge with or come close to (e.g., within a pre-determined distance of) the driving path from the current location of the vehicle.

The pure pursuit controller algorithm and the Stanley controller algorithm are known algorithms can use the converted GPS coordinates of the vehicle's current location, the vehicle's heading (e.g., azimuth information), and the driving path information to determine a course correction trajectory 306 or 308 so that the vehicle can be steered on or close to the driving path to minimize the distance between the vehicle 302 and the driving path where the vehicle is expected to be driven. The course correction trajectory 306 or 308 can include a set of points that minimize a difference between the vehicle's current trajectory (which can be described by the vehicle's current location and heading) and the driving path information. The course correction trajectory 306 or 308 may be described using GPS coordinates or a minimizing set of distances from the current location of the vehicle 302 to the location where the vehicle merges with or is close to the driving path where the vehicle is expected to be driven. The driving operation module uses the course correction trajectory related information (e.g., GPS coordinates or minimizing set of distances) to determine a steering angle to steer the vehicle 302.

The difference between pure pursuit controller algorithm and Stanley controller algorithm is that the pure pursuit controller algorithm can provide a course correction trajectory 306 that gently minimize the distance between the vehicle's location and the driving path. Compared to the pure pursuit controller algorithm, the Stanley controller algorithm may indicate a course correction trajectory 308 that more expeditiously minimize the distance between vehicle's location and the driving path. Thus, the pure pursuit controller algorithm is advantageous at higher vehicle speeds when a more gentle correction should be applied to steer the vehicle close to or on the driving path, and the Stanley controller algorithm is advantageous at lower vehicle speeds when the vehicle can be safely steered at greater steering angles to steer the vehicle close to or on the driving path.

In some other embodiments, if the driving operation module determines that the current speed of the vehicle 302 is greater than or equal to a pre-determined threshold, then the driving operation module can use the Stanley controller algorithm to determine the amount of steering to apply to direct the vehicle to merge with or come close to the driving path from the current location of the vehicle. In some other embodiments, if the driving operation module determines that the current speed of the vehicle 302 is less than a pre-determined threshold, then the driving operation module can use a pure pursuit controller algorithm to determine the amount of steering to apply to direct the vehicle to merge with or come close to the driving path from the current location of the vehicle. This patent document describes for some embodiments techniques to direct the vehicle to merge with or come close to the driving path from the current location of the vehicle by using a pure pursuit controller algorithm for high-speed steering control strategy and a Stanley controller algorithm for a low-speed steering control strategy. In some embodiments, other types of controller algorithms can be used instead of or along with the pure pursuit controller algorithm and/or Stanley controller algorithm.

In some embodiments, the driving operation module can determine that a fault condition has occurred in response to receiving a message from one or more devices on the vehicle indicating that a fault has occurred. For example, the driving operation module can receive a message from the sensor data processing module indicating that multiple cameras (or all cameras) on the vehicle have stopped sending images or sensor data to the sensor data processing module. In another example, the driving operation module can receive a message from the transmission indicating that there was a transmission failure. In yet another example, the driving operation module can determine that a fault condition has occurred in response to determining that the path planning module has not received the formatted location information from the sensor data processing module for more than a pre-determined length of time (e.g., for more than two seconds). When the driving operation module determines that a fault condition has occurred, the driving operation module can obtain the driving path information corresponding to the most recent complete set of position information for the plurality of points.

Figure 4:
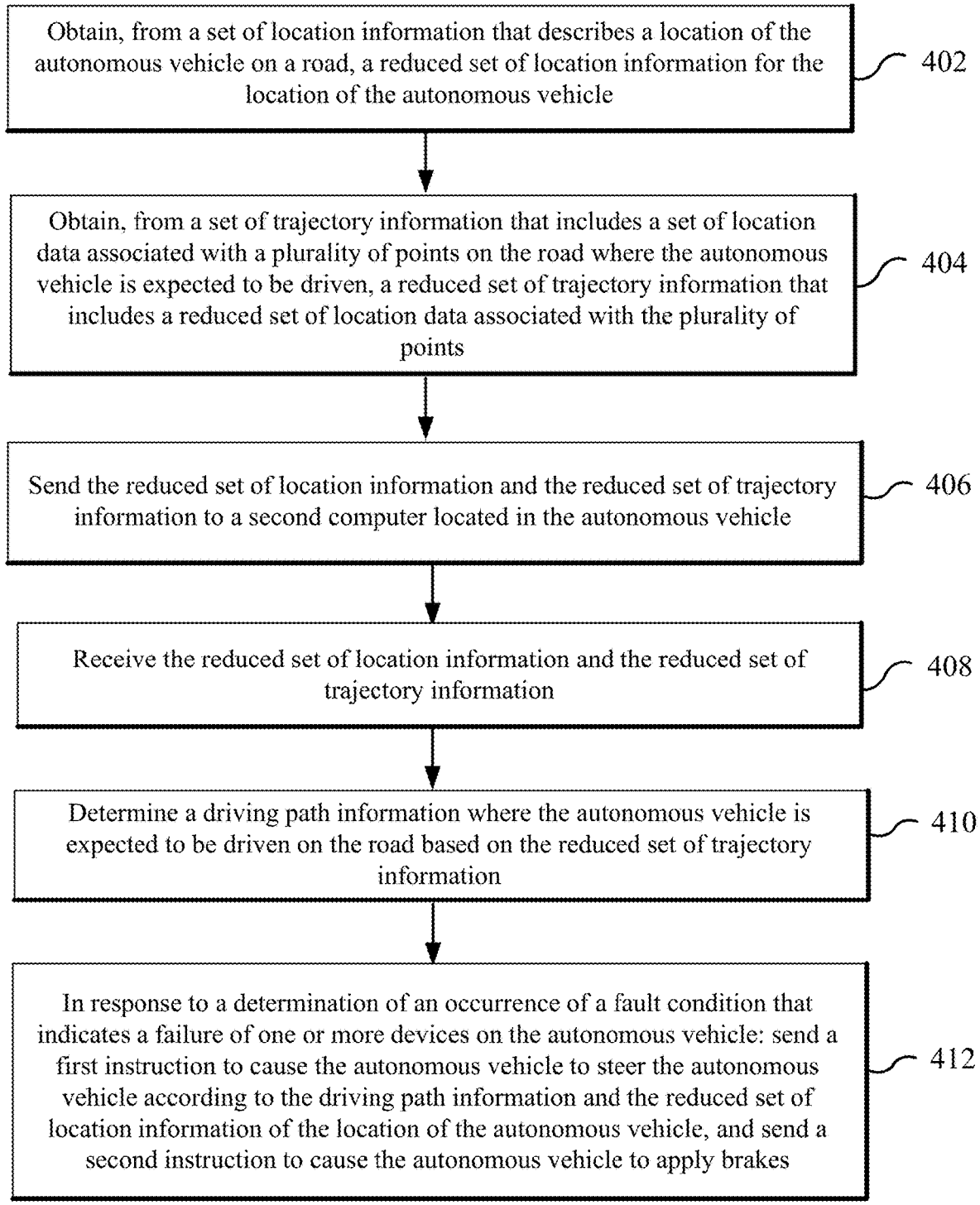
FIG. 4 shows a flowchart of operations performed by an example system to control a vehicle when a failure condition occurs.

FIG. 4 shows flowchart of operations performed by an example system to control a vehicle when a failure condition occurs. The example system includes a first computer (e.g., in-vehicle control computer 150) located in an autonomous vehicle includes a first processor that can be configured to perform operations 402 to 406, and a second computer (or a controller, such as an ECU 148) located in an autonomous vehicle includes a second processor that can be configured to perform operations 408 to 412.

Operation 402 includes obtaining, from a set of location information that describes a location of the autonomous vehicle on a road, a reduced set of location information for the location of the autonomous vehicle. Operation 404 includes obtaining, from a set of trajectory information that includes a set of location data associated with a plurality of points on the road where the autonomous vehicle is expected to be driven, a reduced set of trajectory information that includes a reduced set of location data associated with the plurality of points. Operation 406 includes sending the reduced set of location information and the reduced set of trajectory information to a second computer located in the autonomous vehicle.

Operation 408 includes receiving receive the reduced set of location information and the reduced set of trajectory information. Operation 410 includes determining a driving path information where the autonomous vehicle is expected to be driven on the road based on the reduced set of trajectory information. Operation 412 includes in response to determining an occurrence of a fault condition that indicates a failure of one or more devices on the autonomous vehicle: sending a first instruction to cause the autonomous vehicle to steer the autonomous vehicle according to the driving path information and the reduced set of location information of the location of the autonomous vehicle, and sending a second instruction to cause the autonomous vehicle to apply brakes.

In some embodiments, for each point in the set of trajectory information and the reduced set of trajectory information, a size of location data associated with one point in the set of trajectory information is greater than that of a corresponding point in the reduced set of trajectory information. In some embodiments, the reduced set of location information include a longitude value, a latitude reference value, and an altitude value obtained from the set of location information, and each of the longitude value, the latitude reference value, and the altitude value is associated with a pre-determined numerical characteristic. In some embodiments, the pre-determined numerical characteristic includes a whole number or a number with n-decimal places, where n is greater than or equal to 1. In some embodiments, the set of location information describes the location of the autonomous vehicle using cartesian coordinates, and the reduced set of location information is obtained by a conversion performed on the set of location information from the cartesian coordinates to spherical coordinates.

In some embodiments, the reduced set of location information is sent to the second computer in a first set of data frames at a first pre-determined frequency, and the reduced set of trajectory information is sent to the second computer in a second set of data frames at a second pre-determined frequency. In some embodiments, the second pre-determined frequency is greater than the first pre-determined frequency. In some embodiments, each data frame in the second set of data frames includes one or more locations from the reduced set of location data and one or more index values corresponding to the one or more locations. In some embodiments, a total number of the plurality of points is pre-determined, and the total number of the plurality of points is sent to the second computer. In some embodiments, the reduced set of location information and the reduced set of trajectory information includes geographic information with a precision that is less than that of the set of location information and the set of trajectory information, respectively.

Figure 5:
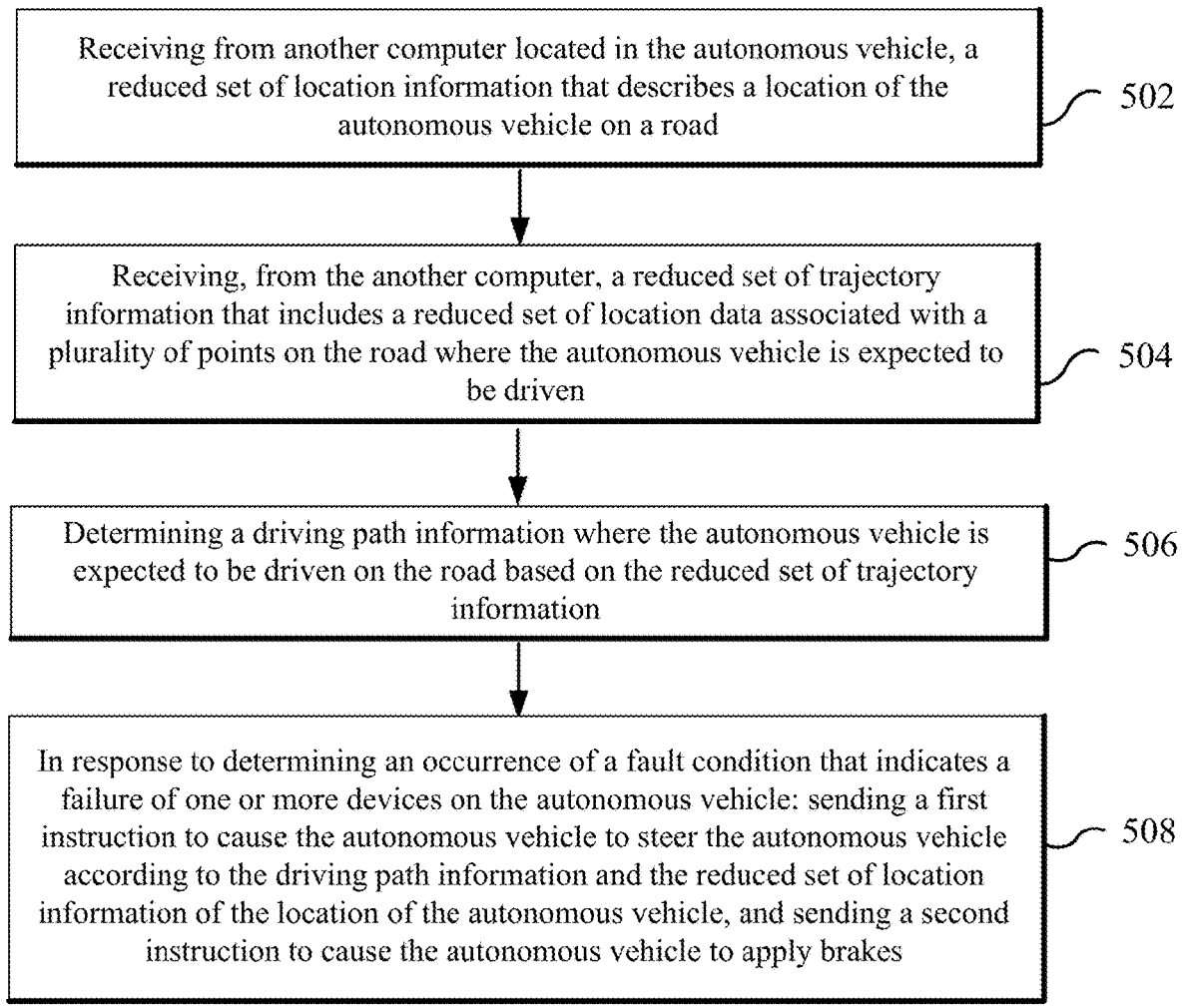
FIG. 5 shows a flowchart for controlling a vehicle when a failure condition occurs.

FIG. 5 shows flowchart for controlling a vehicle when a failure condition occurs. Operations 502 to 506 can be performed by the ECU 148. Operation 502 includes receiving from another computer located in the autonomous vehicle, a reduced set of location information that describes a location of the autonomous vehicle on a road. The reduced set of location information includes information that is less than that associated with a set of location information for the location of the autonomous vehicle. Operation 504 includes receiving, from the another computer, a reduced set of trajectory information that includes a reduced set of location data associated with a plurality of points on the road where the autonomous vehicle is expected to be driven. The reduced set of trajectory information includes information that is less than that associated with a set of trajectory information that includes a set of location data associated with the plurality of points. Operation 506 includes determining a driving path information where the autonomous vehicle is expected to be driven on the road based on the reduced set of trajectory information. Operation 508 includes in response to determining an occurrence of a fault condition that indicates a failure of one or more devices on the autonomous vehicle: sending a first instruction to cause the autonomous vehicle to steer the autonomous vehicle according to the driving path information and the reduced set of location information of the location of the autonomous vehicle, and sending a second instruction to cause the autonomous vehicle to apply brakes.

In some embodiments, the reduced set of location data in the reduced set of trajectory information is determined based on the location of the autonomous vehicle and the set of location data associated with the plurality of points in the set of trajectory information. In some embodiments, the reduced set of location data in the reduced set of trajectory information describe, for each point, a position information of a point relative to the location of the autonomous vehicle. In some embodiments, the driving path information includes a set of position information along a fitted line that fits the plurality of points associated with the reduced set of trajectory, where the fitted line is determined by an application of an n-th order polynomial to the reduced set of trajectory information, and where a value for n is pre-determined. In some embodiments, the processor of the computer (or the second processor of the second computer) is configured to determine that the fault condition occurs in response to a reception of a message that indicates that images or sensor data are not received from a plurality of cameras on the autonomous vehicle.

In some embodiments, a steering angle with which the autonomous vehicle is steered is included in the first instruction to cause the autonomous vehicle to steer, and the steering angle is determined based on the driving path information, the reduced set of location information of the location of the autonomous vehicle, a heading of the autonomous vehicle, and a speed of the autonomous vehicle. In some embodiments, the steering angle is determined using a course correction trajectory information that includes a set of points that indicate a trajectory that minimizes a difference between the driving path information and a current trajectory of the autonomous vehicle, the current trajectory of the autonomous vehicle is defined by reduced set of location information of the autonomous vehicle and the heading of the autonomous vehicle, and the course correction trajectory information depends on whether the speed of the autonomous vehicle is greater than or equal to a pre-determined threshold. In some embodiments, a maximum distance between any two points in the plurality of points is pre-determined. In some embodiments, the fault condition is determined to occur in response to determining that the computer has not received the following information for more than a pre-determined length of time: another reduced set of location information for another location of the autonomous vehicle on the road, or another reduced set of trajectory information that include another set of points on the road where the autonomous vehicle is expected to be driven.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A system for autonomous driving operation, comprising:
    a first processor configured to:
        obtain, from a set of location information that describes a location of an autonomous vehicle on a road, a reduced set of location information for the location of the autonomous vehicle;
        obtain, from a set of trajectory information that includes a set of location data associated with a plurality of points on the road where the autonomous vehicle is expected to be driven, a reduced set of trajectory information that includes a reduced set of location data associated with the plurality of points; and
        send, to a second processor, the reduced set of location information and the reduced set of trajectory information, the second processor configured to:
        receive, from the first processor, the reduced set of location information and the reduced set of trajectory information;
        determine, based on the reduced set of trajectory information a driving path information where the autonomous vehicle is expected to be driven on the road; and
        in response to a determination of an occurrence of a fault condition on the autonomous vehicle:
            send a first instruction to cause the autonomous vehicle to steer the autonomous vehicle according to the driving path information and the reduced set of location information of the location of the autonomous vehicle.

2. The system of claim 1, wherein, for each point in the set of trajectory information and the reduced set of trajectory information, a size of location data associated with one point in the set of trajectory information is greater than that of a corresponding point in the reduced set of trajectory information.

3. The system of claim 1,
    wherein the reduced set of location information include a longitude value, a latitude reference value, and an altitude value obtained from the set of location information, and
    wherein each of the longitude value, the latitude reference value, and the altitude value is associated with a pre-determined numerical characteristic.

4. The system of claim 3, wherein the pre-determined numerical characteristic includes a whole number or a number with n-decimal places, wherein n is greater than or equal to 1.

5. The system of claim 3,
    wherein the set of location information describes the location of the autonomous vehicle using cartesian coordinates, and
    wherein the reduced set of location information is obtained by a conversion performed on the set of location information from the cartesian coordinates to spherical coordinates.

6. The system of claim 1,
    wherein the reduced set of location information is sent to the second processor in a first set of data frames at a first pre-determined frequency, and
    wherein the reduced set of trajectory information is sent to the second processor in a second set of data frames at a second pre-determined frequency.

7. The system of claim 6, wherein the second pre-determined frequency is greater than the first pre-determined frequency.

8. The system of claim 6, wherein each data frame in the second set of data frames includes one or more locations from the reduced set of location data and one or more index values corresponding to the one or more locations.

9. The system of claim 1, wherein a total number of the plurality of points is pre-determined, and wherein the total number of the plurality of points is sent to the second processor.

10. The system of claim 1, wherein the reduced set of location information and the reduced set of trajectory information includes geographic information with a precision that is less than that of the set of location information and the set of trajectory information, respectively.

11. A computer located in an autonomous vehicle, the computer comprising a processor, configured to implement a method comprising:
   receive, from another computer located in the autonomous vehicle, a reduced set of location information that describes a location of the autonomous vehicle on a road,
      wherein the reduced set of location information includes information that is less than that associated with a set of location information for the location of the autonomous vehicle;
   receive, from the another computer, a reduced set of trajectory information that includes a reduced set of location data associated with a plurality of points on the road where the autonomous vehicle is expected to be driven,
      wherein the reduced set of trajectory information includes information that is less than that associated with a set of trajectory information that includes a set of location data associated with the plurality of points;
   determine a driving path information where the autonomous vehicle is expected to be driven on the road based on the reduced set of trajectory information; and
   in response to a determination of an occurrence of a fault condition that indicates a failure of one or more devices on the autonomous vehicle:
      send a first instruction to cause the autonomous vehicle to steer the autonomous vehicle according to the driving path information and the reduced set of location information of the location of the autonomous vehicle.

12. The computer of claim 11, wherein the reduced set of location data in the reduced set of trajectory information is determined based on the location of the autonomous vehicle and the set of location data associated with the plurality of points in the set of trajectory information.

13. The computer of claim 12, wherein the reduced set of location data in the reduced set of trajectory information describe, for each point, a position information of a point relative to the location of the autonomous vehicle.

14. The computer of claim 11,
   wherein the driving path information includes a set of position information along a fitted line that fits the plurality of points associated with the reduced set of trajectory information,
   wherein the fitted line is determined by an application of an n-th order polynomial to the reduced set of trajectory information, and
   wherein a value for n is pre-determined.

15. The computer of claim 11, wherein the processor of the computer is configured to determine that the fault condition occurs in response to a reception of a message that indicates that images or sensor data are not received from a plurality of cameras on the autonomous vehicle.

16. A non-transitory computer readable program storage medium having code stored thereon, the code, when executed by a processor, causing the processor to implement a method comprising:
   receiving, from a computer, a reduced set of location information that describes a location of an autonomous vehicle on a road,
      wherein the reduced set of location information includes information that is less than that associated with a set of location information for the location of the autonomous vehicle;
   receiving, from the computer, a reduced set of trajectory information that includes a reduced set of location data associated with a plurality of points on the road where the autonomous vehicle is expected to be driven,
      wherein the reduced set of trajectory information includes information that is less than that associated with a set of trajectory information that includes a set of location data associated with the plurality of points;
   determining a driving path information where the autonomous vehicle is expected to be driven on the road based on the reduced set of trajectory information; and
   in response to determining an occurrence of a fault condition that indicates a failure of one or more devices on the autonomous vehicle:
      sending a first instruction to cause the autonomous vehicle to steer the autonomous vehicle according to the driving path information and the reduced set of location information of the location of the autonomous vehicle.

17. The non-transitory computer readable program storage medium of claim 16,
   wherein a steering angle with which the autonomous vehicle is steered is included in the first instruction to cause the autonomous vehicle to steer, and
   wherein the steering angle is determined based on the driving path information, the reduced set of location information of the location of the autonomous vehicle, a heading of the autonomous vehicle, and a speed of the autonomous vehicle.

18. The non-transitory computer readable program storage medium of claim 17,
   wherein the steering angle is determined using a course correction trajectory information that includes a set of points that indicate a trajectory that minimizes a difference between the driving path information and a current trajectory of the autonomous vehicle,
   wherein the current trajectory of the autonomous vehicle is defined by the reduced set of location information of the autonomous vehicle and the heading of the autonomous vehicle, and
   wherein the course correction trajectory information depends on whether the speed of the autonomous vehicle is greater than or equal to a pre-determined threshold.

19. The non-transitory computer readable program storage medium of claim 16, wherein a maximum distance between any two points in the plurality of points is pre-determined.

20. The non-transitory computer readable program storage medium of claim 16,
   wherein the fault condition is determined to occur in response to determining that the computer has not received the following information for more than a pre-determined length of time:
      another reduced set of location information for another location of the autonomous vehicle on the road, or
      another reduced set of trajectory information that include another set of points on the road where the autonomous vehicle is expected to be driven.

* * * * *